United States Patent [19]

Heddebaut

[11] Patent Number: 5,057,797
[45] Date of Patent: Oct. 15, 1991

[54] SYSTEM FOR TRANSMITTING BROADBAND DATA AND/OR INSTRUCTIONS BETWEEN AN ELEMENT MOVING IN ONE PLANE AND A CONTROL STATION

[75] Inventor: Marc Heddebaut, Sainghin en Melantois, France

[73] Assignee: Alsthom, Cedex, France

[21] Appl. No.: 378,683

[22] Filed: Jul. 12, 1989

[30] Foreign Application Priority Data

Jul. 12, 1988 [FR] France ................ 88 09471

[51] Int. Cl.$^5$ ............................................. H01P 5/00
[52] U.S. Cl. ........................................ 333/24; 333/248
[58] Field of Search ............. 333/248, 256, 257, 24 R; 343/757, 758, 762; 246/8

[56] References Cited

U.S. PATENT DOCUMENTS

| | | | |
|---|---|---|---|
| 2,465,719 | 3/1949 | Fernsler | 333/248 |
| 3,230,535 | 1/1966 | Ferrante et al. | 343/762 |
| 3,419,826 | 12/1968 | MacWilliams Jr. et al. | 333/248 |
| 3,491,363 | 1/1970 | Young Jr. | 343/768 |
| 3,546,699 | 12/1970 | Smith | 343/762 X |
| 3,609,675 | 9/1971 | Abele | 333/109 |
| 4,054,850 | 10/1977 | Gerrish | 333/24 R |
| 4,453,164 | 6/1984 | Patton | 342/372 X |
| 4,700,152 | 10/1987 | Wilson | 333/24 C |
| 4,932,617 | 6/1990 | Heddebaut et al. | 343/770 X |

FOREIGN PATENT DOCUMENTS 2404363 10/1974 Fed. Rep. of Germany .
2555909 6/1977 Fed. Rep. of Germany .
47101 4/1981 Japan ................................... 333/248

OTHER PUBLICATIONS

Dalichau et al., "Slotted Waveguide Communication Systems"; Frequenz; vol. 35, No. 12, Dec. 1981; pp. 22–39.

Primary Examiner—Eugene R. Laroche
Assistant Examiner—Benny T. Lee
Attorney, Agent, or Firm—Sughrue, Mion, Zinn, Macpeak & Seas

[57] ABSTRACT

A system for transmitting broadband data signals between a mobile element and a fixed control station utilizes a fixed hollow tube forming a fixed waveguide for microwaves provided with a continuous longitudinal center slot and a movable hollow tube carrying the moving element and forming a moving waveguide for microwaves. The movable hollow tube has a longitudinal axis which forms an angle with the longitudinal axis of the fixed hollow tube and is equipped with an electric antenna penetrating into the center slot of the fixed hollow tube and coupled to the movable hollow tube via a coaxial cable-to-waveguide transition. The movable hollow tube is also provided with an elongated center slot parallel to its longitudinal axis and cooperates with a transmit and/or receive antenna for transmitting the microwave radiation to the mobile element linked thereby with the fixed control station.

4 Claims, 2 Drawing Sheets

SYSTEM FOR TRANSMITTING BROADBAND DATA AND/OR INSTRUCTIONS BETWEEN AN ELEMENT MOVING IN ONE PLANE AND A CONTROL STATION

This invnetion concerns a system for transmitting broadband data and/or instrctions and/or localiztion signals between an element moving in one plane and a control station thereof.

BACKGROUND OF THE INVENTION

The applicant has already proposed, in French Patent FR-A-2608119, a system for transmitting broadband data and/or instructions between a railway vehicle and a traffic control station, and likewise proposed, in French Patent FR-A-2612715, a system for transmitting data and/or instructions between road vehicles and a contro station. These systems however apply only to transmissions between a hollow tube forming a microwave guide and a vehicle following a path substantially parallel to and a short distance from the hollow tube, having lateral motions which connot exceed a few tens of centimeters. The did not enable the transmission of data and/or instructions between a control station and an element moving in one plane, which might be at considerably varying distances from the hollow tube waveguide, of the order of several meters for example.

SUMMARY OF THE INVENTION

The object of the invention is to provide for the latter type of transmission of data and/or instructions, particularly in the case of communications links between a control station and a travelling crane or a remote manioulator in a hazardous environment.

The system according to the invention is characterized in that it comprises:

a) a fixed hollow tube forming a waveguide for microwaves, equipped with a continuous longitudinal center slot, b) a moving hollow tube, carrying the moving element and forming a microwave guide, whose axis forms an angle with the fixed waveguide-forming hollow tube, and constrained to move in translation parallel to the continuous longitudinal center slot of the fixed hollow tube, and equipped with an electric antenna plunging into said center slot, with a coaxial cable-to-waveguide transition and with means for transmitting radiation at microwave frequencies with the mibile element to be communicatively linked with the control station.

The system furthermore preferably includes at least one of the following features:

The fixed hollow tube is provided with a continuous longitudinal center slot and the means for transmitting the radiation at microwave frequencies from this tube to the moving element comprise said continuous center slot in the fixed hollow tube and an antenna associated with the moving element plynging into said continuous center slot.

The moving hollow tube is provided with radiating slots perpendicular to its axis and the moving element is provided with a receivving and/or transmitting antenna able to transmit towards the slots in the moving hollow tube.

It comprises at least one microwave generator able to operate at three different frequencies, a) a first frequency of which excites a fundamental TE01 mode in the fixed and moving hollow and provides a uniform field above the network of radiating slots of the moving hollow tube, b) a second of which excsites a fundamental TE01 mode in the fixed and moving hollow tubes and causes fluctuations of the field above the network of radiating slots of the moving hollow tube and c) a third of which excites a higher order mode, preferably TE02, in the fixed hollow tube and a fundamental mode in the moving hollow tube, and the cross section of the moving hollow tube is smaller than that of the fixed hollow tube.

For reasons of convenience, the moving hollow, tube and fixed hollow tube will most often be arranged at a right angle to one another.

Using a fixed hollow tube provided with a continuous longitudinal center slot and a moving hollow tube provided with an electric antenna plunging into the center slot of the fixed tube affords the advantage of radiating only a very amount of energy, which ensures that sufficient energy reaches the receivers to provide a good link.

The electric antennas penetrating the longitudinal center slot of the fixed hollow tube and, alternatively, also that of the moving hollow tube, are arranged within the waveguide-forming hollow tubes in a location where the electric field is strongest. The coupling with this antenna is therefore very strong.

Moreover, when the system as a whole is arranged within a metallic cage, the wave received by the moving element does not interfere with other electromagnetic signals reflected by the walls of the cage since the system radiates only a very small amount of energy outside the waveguide.

BRIEF DESCRIPTION OF THE DRAWINGS

Systems according to the invention for transmitting data and/or instructions between a control station and a manipulator vehicle arranged in an enclosure subjected to ionizing radiation will now be described, by way of example, with reference to the accompanying drawings, in which.

DETAILED DESCRIPTION

Figure 1:
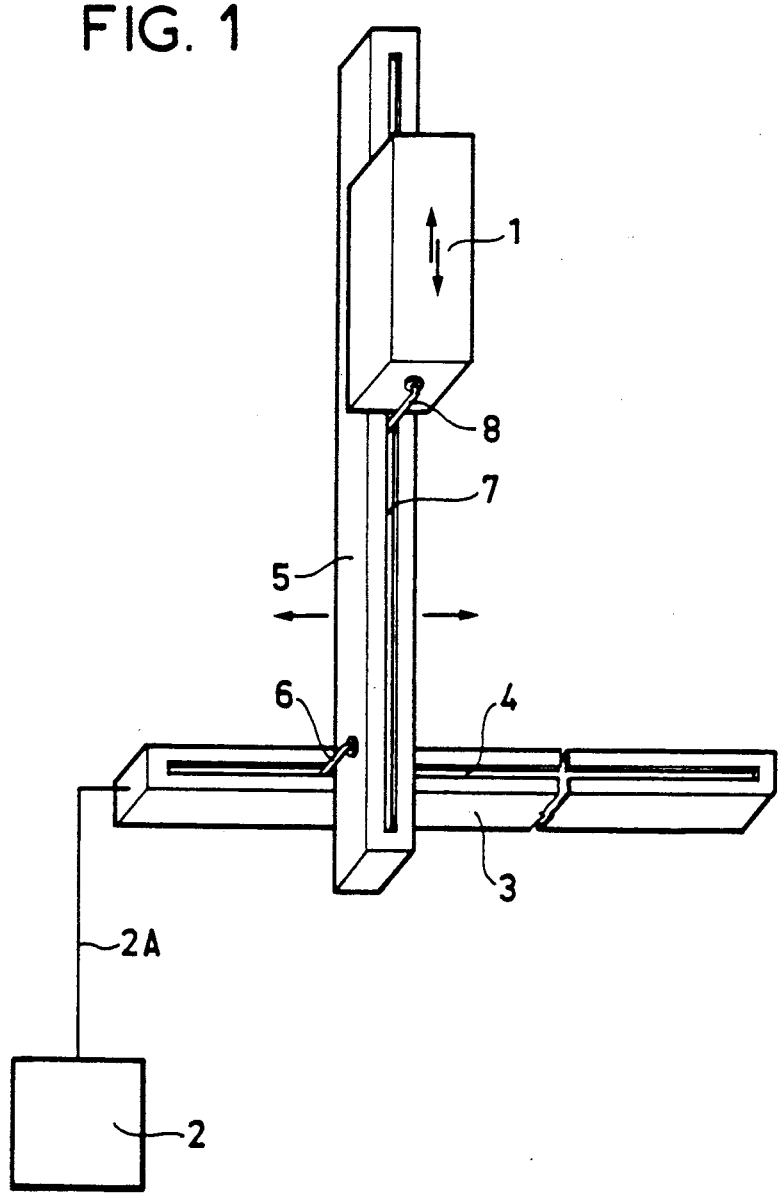
FIG. 1 gives a schematic view in perspective of a system in which both the moving hollow tube and the fixed hollow tube are provided with a continuous longitudinal center slot.

In FIG. 1, the vehicle 1 exchanges instructions and data with the control station represented diagrammatically by a block 2. The fixed control station is linked via a link 2A to the microwave waveguide-forming fixed hollow tube or fixed waveguide 3, having a continuous longitudinal center slot 4.

The waveguide-forming, movable hollow tube or moving waveguide 5, perpendicular to the longitudinal axis of the fixed hollow tube and moving in translation parallel to the longitudinal center slot of the movable hollow tube 5 carries a transmit and receive antenna 6 plunging into the center slot 4. This antenna communicates with the inside of the moving waveguide via a coaxial cable-to-waveguide transition which transfer to the movable hollow tube 5 all the energy picked up by the antenna.

The moving hollow tube 5 also has a continuous center slot 7, into which penetrates the transmit and receive antenna 8 of the remote manipulator vehicle 1.

Figure 2:
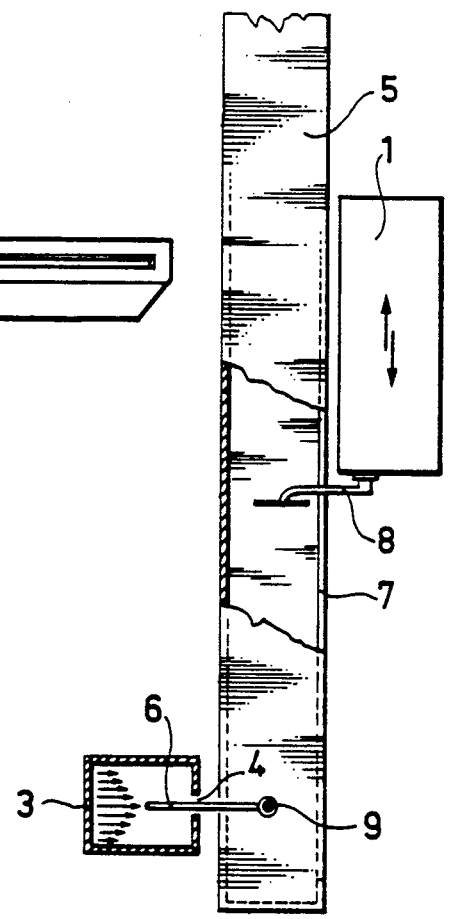
FIG. 2 shows a cross section of the system of FIG. 1, taken in a plane perpendicular to the axis of the fixed hollow tube.

FIG. 2 shows in greater detail that the antenna 6 of the moving waveguide penetrates through the fixed slot 4 in the area of the fixed waveguide where the energy of the microwaves, represented by the arrows, is greatest. The antenna 6 is connected via a coaxial cable-to-waveguide transition 9 to the inside of the moving waveguide 5. The antenna 8 of the remote manipulator vehicle 1 penetrates into the moving waveguide's center slot.

Figure 3:
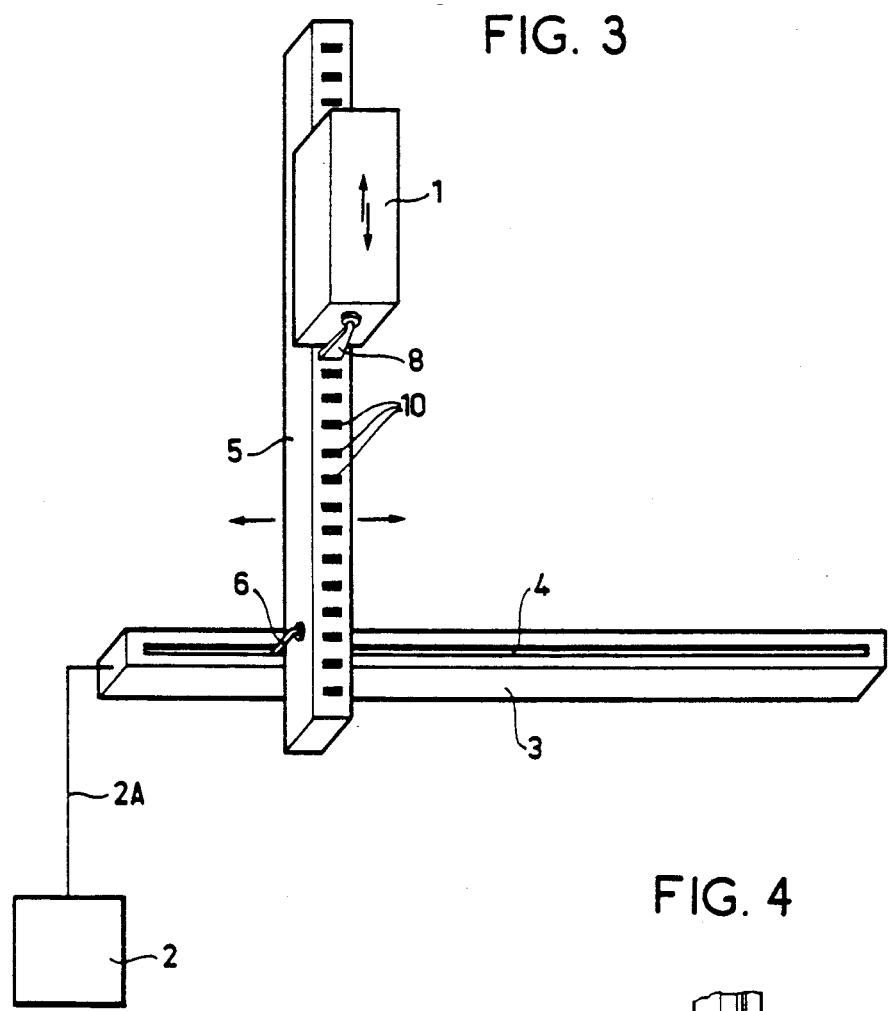
FIG. 3 gives a schematic view in perspective of a system in which the moving hollow tube is provided with radiating slots perpendicular to its longitudinal axis.

In the system represented in FIG. 3, the waveguide forming, fixed hollow tube is analogous to that shown in FIGS. 1 and 2, except that the moving, waveguide-forming hollow tube is pierced through its top face with radiating slots 10 perpendicular to its axis. The antenna 8 associated with the vehicle 1 thus picks up the microwave frequency radiation emitted through these slots. This arrangement moreover allows the position of the vehicle in relation to the moving waveguide to be detected.

In the system of FIG. 3, three frequencies are used, specifically:

A first frequency excites a fundamental TE01 mode in the fixed and moving waveguides and ensures a uniform field above the radiating slots provided in the moving waveguide, for transmitting video signals or control signals for example. This frequency may be, for exmple, 2450 MHz.

A second frequency likewise excites a fundamental TE01 mode in the fixed and moving waveguides, but instead causes fluctuations of the electromagnetic field received above the radiating slots of the moving hollow tube. This allows the relative position Y of the vehicle on the hollow tube to be obtained. This frequency may be, for example, 2700 MHz.

A third frequency (E.G. 2800 MHz) excites a higher order wave mode (e.g. TE02) in the fixed waveguide; the plunging antenna in the moving waveguide then sees maxima and minima of the electromagnetic field instead of a constant field in the fundamental mode. The position of these extrema will be strictly a function of the cross section of the fixed waveguide and the frequency.

Figure 4:
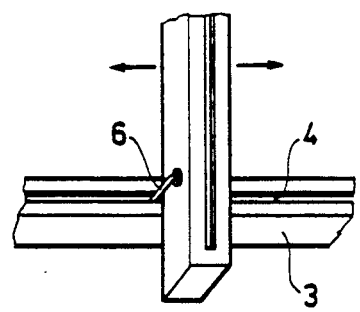
FIG. 4 is a schematic perspective view of a portion of a system corresponding to that of FIGS. 1 and 2 in which the movable hollow tube is smaller in cross section than that of the fixed hollow tube.

The cross section of the moving waveguide is selected to be smaller than that of the fixed waveguide FIG. 4; thus, field variations picked up by the antenna will be transmitted without deformation to the vehicle (the excitation mode being TE01 for this frequency in the moving waveguide). One thus obtains the relative position X of the vehicle relative to the fixed hollow tube.

Since the range of the link is small and since the radiation does not leave the metal cage, it is possible to use higher frequencies than when using only a single frequency, in order to allow smaller waveguide cross sections with negligible attenuation per unit length.

When center-slotted fixed and moving waveguides are used, coupling losses are very small and thus the power requirements much less (of the order of 1 mW) than when the moving waveguide has slots perpendicular to its axis. It is also possible in this case to obtain the position of the vehicle, provided the fixed and moving waveguides are given different cross sections.

The invention applies especially to remote manipulators or to robots for handling or stocking nuclear fuels or waste materials.

It should be obvious that the invention applies equally to control of an element moving in a vertical plane as to one moving in a horizontal plane. Further, systems can be combined to control movements in different planes, for example horizontal and vertical planes, such as to control the movements of an element in a three-dimensional space.

I claim:

1. A system for transmitting broadband data signals between a mobile element and a fixed control station using a microwave radiation, said system comprising:
   a) a fixed elongated hollow tube forming a fixed waveguide for microwaves and linked with said fixed control station to transmit the microwave radiation, said fixed hollow tube having a longitudinal axis and a continuous longitudinal center slot;
   b) a movable elongated hollow tube, having a longitudinal axis, carrying the mobile element and forming a moving waveguide for microwaves, the longitudinal axis of said movable hollow tube forming an angle with the longitudinal axis of the fixed hollow tube and being in juxtaposition thereto, said moving waveguide moving along the center slot of the fixed hollow tube and being equipped with a first antenna and including a coaxial cable-to-waveguide transition plunging into said center slot of said fixed hollow tube, and means for transmitting the microwave radiation to the mobile element, said movable hollow tube being provided with a continuous longitudinal center slot and means for transmitting the microwave radiation from said movable hollow tube to the mobile element including a second antenna associasted with the mobile element and said continuous center slot of said movable hollow tube, and wherein said second antenna includes a second, coaxial cable to waveguide transition plunging in said continuous center slot of said movable hollow tube, and said mobile element moving along the center slot of said movable hollow tube.

2. A system for transmitting broadband data signals between a mobile element and a fixed control station using a microwave radiation, said system comprising:
   a) a fixed elongated hollow tube forming a fixed waveguide for microwaves and linked with said fixed control station to transmit the microwave radiation, said fixed hollow tube having a longitudinal axis and a continuous longitudinal center slot;
   b) a movable elongated hollow tube, having a longitudinal axis, carrying the mobile element and forming a moving waveguide for microwaves, said movable hollow tube being provided with a plurality of longitudinally spaced radiating slots perpendicular to said longitudinal axis and wherein the movable hallow tube is provided with a first antenna. operably coupled in said longitudinal slot to transmit the microwave radiation between the movable hollow tube and the fixed hollow tube, and means for transmitting the radiation at microwave frequencies from said movable hollow tube to the mobile element including the plurality of longitudinally spaced radiating slots perpendicular to said longitudinal axis and a second antenna associated with the mobile element and said second antenna selectively alignable with a given one of said longitudinally spaced radiating slots, and said mobile element moving along the longitudinal axis of said mobile hollow tube.

3. The system according to claim 2, wherein said at least one microwave generator is operable at a third frequency which excites a TE02 mode in the fixed hollow tube and a fundamental TE01 mode in the movable hollow tube.

4. A system according to claim 2, further including said fixed control station having at least one microwave generator operable at three different frequencies,
   a) a first frequency which excites a fundamental TE01 mode in the fixed and movable hollow tubes and provides a uniform field above the radiating slots of the movable hollow tube,
   b) a second frequency which excites a fundamental TE01 mode in the fixed and movable hollow tubes and causes fluctuations of the field above the network of radiating slots of the movable hollow tube and
   c) a third frequency which excites a higher order mode in the fixed hollow tube and a fundamental TE01 mode in the movable hollow tube, and wherein the movable hollow tube has a smaller cross section than a corresponding cross section of the fixed hollow tube.

* * * * *